Patented Apr. 16, 1935

1,997,766

UNITED STATES PATENT OFFICE 1,997,766

PROCESS OF PREPARING CELLULOSE NITRATE

Paul Boyd Cochran, Parlin, N. J., and Maurice Valentine Hitt, Wilmington, Del., and Leland Van Taylor, Raritan Township, Middlesex County, N. J., assignors to E. I. du Pont de Nemours & Company, Wilmington, Del., a corporation of Delaware No Drawing. Application March 16, 1933, Serial No. 661,108

7 Claims. (Cl. 260—146)

This invention relates to the preparation of cellulose nitrate, and more particularly, to the preparation of cellulose nitrate by the nitration of regenerated cellulose sheeting, and still more particularly, to the nitration of such sheeting previously prepared in suitable form, whereby a cellulose nitrate of low viscosity characteristic is obtained.

The desirability of the commercial availability of cellulose nitrate of low viscosity characteristic for pyroxylin coating compositions is, and has been, an established fact in the industry for some time. To meet the demand for this type of cellulose nitrate numerous expedients have been devised for its preparation; most of these have been discarded because of difficulties encountered in manufacture or because of undesirable characteristics inherent to the coating compositions prepared from these products.

The process generally practiced at the present time to provide a cellulose nitrate of low viscosity characteristic comprises two separate and distinct operations, in the first of which purified cotton linters are nitrated according to standard practice, and in the second of which the cellulose nitrate thus prepared is pressure digested at elevated temperatures in the presence of an inert liquid. This pressure treatment has several basic disadvantages; first, in the multiplicity of steps, in itself complicating manufacturing operations; second, in the hazardous nature of the pressure digestion and the obvious fire and explosion hazard thereupon attendant, and third, in the fact that compositions based on cellulose nitrate produced in this manner do not completely afford all of the qualities preferred in the industry. In many cases where solutions of the desired viscosity are secured, an appreciable amount of "hair" may be present and an undesirable haze sometimes characterizes such solutions.

The raw material of the process of the present invention consists of regenerated cellulose sheeting, one form of which is designated commercially as "Cellophane". This product is manufactured by processes well known in the art, the sheeting being produced by extruding viscose solutions in thin sheets into regenerating baths. The manufacture of regenerated cellulose sheeting forms no part of the present invention and any regenerated cellulose produced in sheet form according to commercial methods used at the present time is suitable for the purpose of this invention. There have been many attempts previously made to nitrate regenerated cellulose sheeting for utilization in the manufacture of acceptable lacquer compositions. This raw material is sharply distinguished from cotton linters (the raw material universally used for the production of low viscosity lacquers) and other fibrous raw materials, such as wood pulp, in that it is distinctly non-fibrous in structure. It is because of this non-fibrous structure that earlier investigators, unsuccessful in satisfactorily nitrating the material, concluded that the non-fibrous character of the material prevented sufficient penetration of the nitrating acids to provide complete nitration. Although the absorption of the nitrating acids by regenerated cellulose sheeting is not as great as the absorption by fibrous types of cellulose, the non-absorbent character of the structure does not prevent the attainment of satisfactory results if the process of the present invention is followed. Large quantities of the basic material as waste or scrap are available and have been for some time, but no process has been worked out for its nitration to provide a satisfactory and commercially acceptable process. In the process of the present invention there has, however, been devised a practical, feasible method providing a commercially acceptable low viscosity cellulose nitrate superior in many respects to that produced from cotton linters.

This invention has as an object a process for the nitration of regenerated cellulose sheeting whereby a cellulose nitrate of low viscosity characteristic is directly secured. Another object of the invention is a process for the manufacture of valuable products from waste or scrap regenerated cellulose sheeting, a waste material of little value heretofore. Another object of the invention is the preparation of regenerated cellulose sheeting in such a form that it may be utilized in the manufacture of cellulose nitrate of low viscosity characteristic of satisfactory stability and degree of nitration, such as to permit its use in lacquer compositions, et cetera. A still further object of the invention is the provision of a process simple, economical, efficient, and safe, which affords particularly uniform results. Another object of the invention is the provision of cellulose nitrate having such bulk density and other properties as to make it particularly desirable and commercially acceptable. Other objects will appear hereinafter.

These objects are accomplished by the nitration, under suitable conditions, of regenerated cellulose sheeting previously prepared in such form as to prevent adherence between adjacent surfaces during the nitrating step of the process.

The starting material of the process, regenerated cellulose sheeting, resulting from the trimming of rough edges, cutting of sheets into certain sizes, and other manufacturing practices, is usually transparent, sometimes colored with pigments or dyes, plasticized or softened with glycerine, or other softeners, to afford flexibility, and frequently coated with a film of lacquer, et cetera, to afford moisture proofing and other desirable properties. Because of the presence of these several contaminants, it is, therefore, necessary to pretreat this material to thoroughly remove the coating and glycerine before subjecting the material to nitrating processes. It is particularly essential that the glycerine be completely eliminated in order to obviate the possible formation of the lower nitrates of glycerine, which, if present in even very small quantities, adversely affects the stability of the final cellulose nitrate.

In order to facilitate the removal of the glycerine and any coating which may be present on the regenerated cellulose sheeting, it has been found convenient to reduce the sheeting to relatively small sized particles. In order to accomplish this, the raw material, (sheets, waste trimmings, etc.,) is dry cut or ground in a rotary cutter, hammer mill, stamp mill, shredder, or any other mechanical device which will reduce the material to such fineness that it will pass through a $\frac{1}{16}''$ or $\frac{1}{32}''$ screen. A Ball and Jewell rotary cutter has been found to be particularly suitable, since with this equipment the regenerated cellulose sheeting is conveniently comminuted to the desired particle size, having a tendency to curl or crinkle. This tendency to curl or crinkle has a particular bearing on the success of the invention, as described below.

The grinding operation using a hammer mill may be carried out in two steps because of the toughness of the regenerated cellulose sheeting, the first stage reducing the particle size to about $\frac{3}{4}''$ to $1\frac{1}{2}''$ screen fineness, and the second grinding operation reducing the size to approximately $\frac{1}{16}''$ to $\frac{1}{32}''$. The comminution with the rotary cutter is, however, completed in one step. After this treatment the particles are curled or crinkled, and because of these characteristics do not adhere to each other or pack together; thus complete and quick penetration of liquids is provided.

The comminuted sheeting is now discharged into tubs and washed thoroughly with water containing 0.1% sodium hydroxide based on the weight of the charge. The temperature of this solution is preferably 40–45° C., although the temperature may be varied over wide limits to accomplish the same result. The use of sodium hydroxide is optional, since the process may be operated using water without the addition of any reagents. This washing treatment serves to remove glycerine which is readily soluble in water, and also separates the lacquer or other coating which may be present, and which floats to the surface and may be floated off or otherwise removed.

The washing treatment is repeated several times to insure complete removal of glycerine. The following table is given to illustrate a suitable series of steps for washing the ground cellulose sheeting in a removal tub, although it will be understood that the number of washings, temperature of wash water, and duration of the washing may be varied widely:

*Removal of glycerine and lacquer coating*

|   |   | Minutes |
|---|---|---|
| 1. | Water containing 0.1% NaOH 40–50° C. | 25 |
| 2. | Agitate | 45 |
| 3. | Settle | 15 |
| 4. | Flood off coating | 25 |
| 5. | Drain | 30 |
| 6. | Warm water 40–50° C. | 25 |
| 7. | Agitate | 45 |
| 8. | Settle | 10 |
| 9. | Flood off coating | 10 |
| 10. | Drain | 30 |
| 11. | Warm water 40–50° C. | 25 |
| 12. | Agitate | 45 |
| 13. | Settle | 10 |
| 14. | Flood off coating | 10 |
| 15. | Drain | 30 |

The regenerated cellulose sheeting, now freed from extraneous materials, may be dried by any suitable means. A centrifuge may be used to remove the greater proportion of the water and the wet particles further dried by heating on a rotary steam tube drier, or the water slurry of the regenerated cellulose particles may be removed directly to a suitable filter drier, such as an "Oliver" filter, where a cake material is cast on the rotary drum and dried, e. g. to a moisture content of 0.5–5.0%, by means of warm air and an exhaust system. Due to the elongated shape of the particles, the loss of regenerated cellulose through any screen perforations is very slight, the particles tending to bridge over the perforations rather than pass through them. The regenerated cellulose is now in suitable condition for the production of cellulose nitrate.

The ground regenerated cellulose, with a moisture content of 0–2%, and a soda soluble content of 8–20%, may be nitrated according to the following example:

*Example 1.*—The regenerated cellulose is added to a nitrating acid containing 55.0% of total $H_2SO_4$, 27.5% actual $NHO_3$, and 17.5% water in ratio of 36 parts of acid to one part of regenerated cellulose. The acid is previously heated to 52° C. The time of nitration is 48 minutes and agitation throughout the entire nitrating cycle is preferred. The physical condition of the regenerated cellulose in the relatively small particle size is here of particular advantage in affording sufficient "fluidity" to prevent "balling up" from the action of the agitator blades. At the end of the nitrating cycle the charge is dropped to a centrifugal wringer fitted with suitable screens of small perforations to prevent loss of the nitrated regenerated cellulose during the wringing operation. The wringing time is one minute after the centrifugal has reached a maximum speed of 1140 R. P. M. The entire wringing operation requires approximately five minutes.

The nitrated regenerated cellulose is then quenched in water and stabilized as follows:

1. Drained of quenching waters
2. Two cold water washes
3. One 25 hr. boil (water—0.1 to 0.5% acidity as sulfuric)
4. Two 5 hr. boils
5. One hot water wash
6. One 2 hr. boil (water containing 0.5% oxalic acid on weight of charge)
7. Five hot water washes
8. Two cold water washes The nitrated regenerated cellulose sheeting in the form of small crumpled pieces is then dehydrated with denatured alcohol by means of a centrifugal or hydraulic press to 30% and is ready for use in the production of coating compositions. The viscosity of the product of Example 1 was 6–10 seconds, using Formula C of A. S. T. M. specifications D–301—32T. Identical experiments carried out at 58° C. and 46° C. gave products of viscosity 2.5–4.5 seconds and 8–16 seconds, respectively. A yield of 1.50 to 1.55 pounds of celluose nitrate to one pound of purified regenerated cellulose sheeting is normally obtained in following the above procedure, the nitrogen content of the cellulose nitrate being 11.80–12.15%. Similar results are obtained with nitrating acids of the following compositions:—

| Total H$_2$SO$_4$ | 52.3 | 57.5 | 60.0 |
| Actual HNO$_3$ | 30.0 | 25.0 | 23.0 |
| Nitrating total | 82.3 | 82.5 | 83.0 |
| Water | 17.7 | 17.5 | 17.0 |

Although a ratio of 36 parts of acid to one part of regenerated cellulose sheeting has been said to be preferred, ratios within the range of 45–1 to 20–1 acid to cellulose are likewise operative. The nitration may be conducted at temperatures between 40–60° C., depending upon other variables, such as time, acid compositions, et cetera. Temperatures higher than 60° C. require a reduced time of nitration, while temperatures below 40° require a considerable extended nitration time. In general, a range of 45–55° C. is preferred. The time of nitration may be varied from 15 minutes to two hours, depending upon other variable factors, as indicated above. A range between ½ hour and one hour is preferred. The compositions of the acid mixtures used in nitrating may be varied over a wide range, depending upon the nitrogen content desired in the final cellulose nitrate. In general, the acid composition should have not less than 16% water. Compositions containing as high as 20%, or even 25%, water are operative, but with the higher water contents a more extended nitration time must be employed and a lower nitrogen content of the final product results. The sulfuric acid content is preferably less than 60%, although 62% and even 65% may be used. At lower nitrating acid cellulose ratios, e. g., 15:1 a higher nitric acid content must be used, e. g., 60% nitric, 22% sulfuric, 18% water. The nitric acid preferably varies between 19–35%.

The nitrogen content of the cellulose nitrate manufactured according to the process of the present invention may vary between 10.5 and 12.5%, depending upon the acid composition, temperature, etc., used during the process. If a lower nitrogen content is desired, it is generally preferred to use an acid composition of lower nitrating total.

The nitrated regenerated cellulose produced according to the process of Example 1 may be further improved by bleaching. This treatment affords a product of improved color which is, for all practical purposes, quite comparable with good quality commercially available reduced viscosity cellulose nitrate. In this bleaching process the nitrated regenerated cellulose is first treated with a solution of sodium hypochlorite containing 1½% available chlorine, for 1½ to 2 hours at 70° C. It is obvious that the time, temperature, concentrations, etc., may be varied as is known in the art. This solution is then drawn off and the charge given a hot water wash. The water is drained and the charge then subjected to a two-hour boil with a water solution of oxalic acid (approximately 0.4% based on the weight of the charge) for stabilization purposes. This is drained and the material finally washed three or four times with hot water. This bleaching treatment is given as exemplary only, since other treatments, such as with peroxides, chlorine, calcium hypochlorite, etc., will readily occur to those skilled in the art.

When tested according to A. S. T. M. procedure D–301—31T, using Formula C, the viscosity of the product falls within the limits of 6 and 10 seconds: using Formula B, a viscosity of between 1.5 and 2.5 seconds is obtained. The viscosity characteristic of commercially available reduced viscosity cellulose nitrate is 8–16 seconds using Formula C. By varying certain factors in the conditions of nitration, the viscosity characteristic, using formula C, may be raised to 8–16 seconds or lowered to one second or below.

The stability of the product of Example 1 determined as outlined by A. S. T. M. specifications procedure D–301—30T is not less than 35 minutes and is comparable with the stability of commercially available reduced viscosity cellulose nitrate of good quality.

The cellulose nitrate of the present invention is practically completely soluble in the A. S. T. M. viscosity solvents. The solutions are substantially free from turbidity and undissolved material and in this respect are equal, or superior, to solutions of commercially available reduced viscosity cellulose nitrate of good quality.

The cellulose nitrate prepared according to Example 1 and not bleached has a slight amber cast in the flake form when compared with alcohol wet, commercially available reduced viscosity cellulose nitrate and solutions of the product are likewise somewhat deeper in color. Using the Hazen color standard (American Chemical Journal Vol. 14, page 300) as a basis for comparison and giving this standard a value of 10, the A. S. T. M. viscosity solution of the product prepared according to Example 1, described above, will vary from 4–7, whereas similar solutions of the commercial cellulose nitrate usually range from 2–3. Cellulose nitrate prepared according to Example 1 and bleached is very definitely improved in color, although other properties are not affected. The bleached material has a very slight yellow cast when compared with the commercial cellulose nitrate, but in solution it is, for all practical purposes, the equivalent thereof. Using the Hazen color standard described above, the solution of the bleached cellulose nitrate prepared from regenerated cellulose sheeting has a numerical color rating of not more than 3, whereas similar solutions of commercially available reduced viscosity cellulose nitrate usually range from 2–3.

Lacquer solutions based on the nitrated regenerated cellulose of the present invention are equal, or superior, to corresponding solutions of commercially available cellulose nitrate in clarity, freedom from haze, brilliance, and lack of "hair" (unnitrated material).

The nitrogen content resulting from the use of the particular acid mixture, temperature, time, etc., noted above, is from 11.80–12.15%. The nitrogen content may be varied over a wide range, depending upon the combination of the several variables noted above; such practice is well known in the art.

Quantitative tests on films produced from the product of the present invention show it to be quite comparable with commercially available reduced viscosity cellulose nitrate in tensile strength, elongation, and flexibility. Comprehensive durability tests on lacquers based on the nitrated regenerated cellulose sheeting of the present invention, both outdoors and indoors, for considerably more than a year, on wooden and metal bases have shown it to be fully equal in every respect to similar lacquers prepared from commercially available reduced viscosity cellulose nitrate.

In the foregoing description of the several properties of the product of the present invention, "commercially available reduced viscosity cellulose nitrate" may be defined as cellulose nitrate generally available, of viscosity 8–16 seconds using Formula C of A. S. T. M. procedure D–301—32T, produced by pressure digestion at elevated temperatures.

Manufacturing experience extending over a period of considerably more than a year has shown that the material of this invention may be manufactured with remarkable uniformity, and in this respect, quite superior to the cellulose nitrate of low viscosity characteristic produced by processes commonly practiced in the industry.

In the process of Example 1 there was nitrated a regenerated cellulose sheeting previously prepared in a form comminuted to relatively small particle size. When the particles are thus reduced to small, crumpled pieces of single thickness, the nitration is surprisingly complete and easily effected. While this represents a preferred method, satisfactory nitrations may be performed with much larger sized particles. Successful nitrations have been made on regenerated cellulose sheeting approximately ½ x 1½" in size, a precautionary measure being desirable with pieces of this magnitude comprising a crumpling of the pieces, e. g. by passing through corrugated rolls, to prevent adjacent surfaces from cementing together during the nitration process. While material in the size pieces just mentioned may be nitrated without previous crumpling, solutions made from the product are deficient because of the presence of unnitrated material. This is explained by the tendency of flat surfaces to join together and prevent complete penetration of the nitrating acids. A material of this size particle tends to "ball up" on the agitator blades and this promotes a tendency of adjacent surfaces, if flat, to adhere, with resultant poor nitration and inferior solutions. Satisfactory results, however, may be obtained with these larger sized pieces by crumpling the raw material and thus preventing surfaces of any considerable area from coming together. In a process using larger sized particles agitation is carried on for only a short period at the start of the operation in order to prevent "balling up" on the agitator blades. During the remaining time of nitration the cementing tendency of adjacent surfaces is prevented because of the crumpled condition of the pieces. Even larger sized pieces may be successfully nitrated provided measures are taken to prevent areas of any substantial magnitude from coming into contact at any one point. Larger pieces are of advantage from the standpoint of somewhat lower wringer and stabilization losses.

In general, it is not practicable to nitrate "Cellophane" in long sheets in a continuous manner because of the low economy and low efficiency of the process.

In Example 1 a process is outlined for removing glycerine and any lacquer coating from the regenerated cellulose sheeting. Other methods will occur to those skilled in the art for accomplishing the same result, for example, treatment with active solvents, with subsequent recovery of the solvents.

A rotary cutter, hammer mill, stamp mill, and shredder are described as suitable equipment for comminuting the regenerated cellulose sheeting, but any other device reducing the material to approximately the same size and condition will serve the purpose. This step is purely mechanical, the actual physical structure of the comminuted material being more important than the process whereby the structure is obtained.

The essential feature of the process is that surface areas of any substantial magnitude are prevented from coming together, and thus preventing complete penetration of the acids. Nitrating acids will readily penetrate single thicknesses up to 0.0017 inches, or even greater, but when two or more pieces adhere the acids do not penetrate sufficiently to secure complete nitration. This factor was apparently not recognized by the prior art and it was, therefore, not until the present development was completed that successful large scale nitrations of regenerated cellulose sheeting were established on a commercial basis.

This invention provides a very substantial advance in the art as indicated in the following advantages and improvements:

1. The process avoids any additional treatment, subsequent to nitration, to provide a nitrocellulose of low viscosity characteristic. This property is obtained direct.
2. The product is readily utilizable in the preparation of improved lacquers, enamels, cements, etc.
3. A commercially valuable outlet is afforded for a waste material, heretofore having no commercial significance.
4. There is practically an unrestricted source of supply of the raw material.
5. The multiplicity of steps required by the common method of pressure digestion in securing low viscosity nitrocellulose is avoided, thereby effecting substantial operating economies.
6. The product is characterized by marked uniformity in properties.
7. The material which serves as a basis for our raw material has definitely greater resistance to degradation during the nitration process.
8. Lower acid losses are shown, presumably due to the non-fibrous character of the product.
9. Less tendency to fire in dippers and wringers is apparent.
10. More rapid solution of material in lacquer solvents.
11. Lacquer solutions of this product show definite improvement in clarity, freedom from haze, brilliance and absence of "hair".
12. Less dust hazard due to more dense physical structure of the material.
13. Less iron contamination and other types of contamination from nitrating acids, wash water, etc.
14. Lower nitrosyl sulphuric acid content of the spent acid because of the relatively tough and non-fibrous structure of the material, which precludes substantial degradation during nitration.
15. Wider range of ratios of acid to material to be nitrated are permissible. This is of particular importance on the low side of the acid ratio, such as 20:1, which permits greater capacity in any given equipment as well as economy of nitrating acids.

16. It is possible to nitrate this material with higher moisture contents without substantial degradation although this is not generally desirable because of adverse effects on the spent acids.

17. The nitrated product has a much lower bulking value. Because of this factor, the product of the present invention possesses a peculiar advantage in providing greater ease in handling during the entire process, and is also, because of this feature, of considerable merit from the standpoint of shipping and storage. The bulking value of the nitrated regenerated cellulose sheeting in the form manufactured in accordance with the present invention is 27.2 pounds per cubic foot, whereas the bulking value of the commercial nitrocellulose heretofore obtainable is but 18.36 pounds per cubic foot. Thus, where 135 pounds (dry weight) of cellulose nitrate is commonly packed in barrels, 200 pounds (dry weight) of the product of the present invention may conveniently be packed in a similar container.

We claim:

1. Process of preparing low viscosity cellulose nitrate comprising reducing regenerated cellulose sheeting to the form of small crumpled pieces of single thicknesses, washing to free from material other than regenerated cellulose, and nitrating.

2. Process of preparing low viscosity cellulose nitrate comprising reacting one part by weight of small crumpled pieces of regenerated cellulose sheeting of single thicknesses at a temperature of 40–60° C. from one-quarter to two hours with from 20–45 parts by weight of a nitrating acid containing at least 16% water, sulphuric acid in amounts up to 65%, and from 19–30% nitric acid.

3. Cellulose nitrate obtained by the process of claim 6, said cellulose nitrate having a bulking value of at least 25 pounds per cubic foot.

4. Cellulose nitrate obtained by the process of claim 6, said cellulose nitrate being substantially free from unnitrated cellulose and having a bulking value of at least 25 pounds per cubic foot.

5. Cellulose nitrate directly obtained by the process of claim 6, said cellulose nitrate having a viscosity characteristic of less than 16 seconds using Formula C of A. S. T. M. specifications D301—31T.

6. Process of preparing low viscosity cellulose nitrate which comprises reducing regenerated cellulose sheeting to the form of small crumpled pieces of single thicknesses and nitrating the same.

7. Process of claim 6 in which the regenerated cellulose is essentially free from other materials.

PAUL BOYD COCHRAN.
MAURICE V. HITT.
LELAND VAN TAYLOR.